(12) United States Patent
Dai et al.

(10) Patent No.: US 8,968,151 B2
(45) Date of Patent: Mar. 3, 2015

(54) METHOD AND SYSTEM FOR CONTROLLING DRIVELINE LASH IN A HYBRID VEHICLE

(75) Inventors: Zhengyu Dai, Canton, MI (US); Hong Jiang, Birmingham, MI (US); Felix Nedorezov, Rochester Hills, MI (US); Marvin Paul Kraska, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 403 days.

(21) Appl. No.: 13/465,327

(22) Filed: May 7, 2012

(65) Prior Publication Data
US 2013/0296106 A1 Nov. 7, 2013

(51) Int. Cl.
*B60W 10/02* (2006.01)
*B60W 20/00* (2006.01)
*B60K 6/48* (2007.10)
*B60W 10/08* (2006.01)

(52) U.S. Cl.
CPC .......... *B60W 10/02* (2013.01); *B60W 20/1084* (2013.01); *B60K 6/48* (2013.01); *B60W 10/08* (2013.01); *B60W 20/00* (2013.01); *B60K 2006/4825* (2013.01); *B60W 2510/109* (2013.01); *B60W 2710/083* (2013.01); *Y02T 10/6221* (2013.01); *Y02T 10/6252* (2013.01)
USPC ........................................................... 477/5

(58) Field of Classification Search
None
See application file for complete search history.

(56) References Cited

U.S. PATENT DOCUMENTS

| 6,319,168 | B1 | 11/2001 | Morris et al. |
| 6,574,535 | B1 | 6/2003 | Morris et al. |
| 7,234,552 | B2 | 6/2007 | Prema et al. |
| 7,295,902 | B2 | 11/2007 | Chen et al. |
| 2011/0178691 | A1 | 7/2011 | Wang et al. |
| 2012/0265382 | A1* | 10/2012 | Nefcy et al. ..................... 701/22 |

* cited by examiner

*Primary Examiner* — Robert A Siconolfi
*Assistant Examiner* — Huan Le
(74) *Attorney, Agent, or Firm* — James Dottavio; Brooks Kushman P.C.

(57) ABSTRACT

A vehicle has an engine, an upstream clutch, an electric machine, a downstream clutch, a transmission gearbox, and a controller. The controller is configured to: (i) control engagement of the downstream clutch, (ii) monitor a vehicle torque, and (iii) control electric machine torque to a designated rate when the vehicle torque changes direction and the electric machine is operating. A method for controlling a hybrid vehicle includes engaging a clutch downstream of the electric machine, monitoring a vehicle torque, and controlling electric machine torque to a designated rate when vehicle torque changes direction and the electric machine is operating. A hybrid vehicle system has an electric machine and a controller configured to (i) control electric machine torque to a designated rate within a time zone, and (ii) control at least one of the electric machine torque and an engine torque to meet driver demand outside of the zone.

17 Claims, 7 Drawing Sheets

METHOD AND SYSTEM FOR CONTROLLING DRIVELINE LASH IN A HYBRID VEHICLE

TECHNICAL FIELD

Various embodiments relate to a hybrid vehicle and a method of controlling the hybrid vehicle to reduce lash in a driveline.

BACKGROUND

In a vehicle, drivebility may be a concern when the overall vehicle torque crosses the lash zone through the driveline, which may include the transmission gear system, driveline joints, and wheels. The lash zone is when the total vehicle torque changes direction, i.e. from positive torque to negative torque, or vice versa. Lash, or backlash may occur for example due to lost motion caused by slack or clearance within various driveline components when the vehicle torque changes direction, such as during a driver tip in or tip out event. The vehicle torque is made up of the road load torque and torque provided by the prime mover(s) of the vehicle.

In a conventional vehicle, an opened torque converter may be utilized to help damp out the lash zone oscillation with an associated fuel economy penalty. In some of the recent dual clutch transmission without a torque converter, the engine torque going in and out of the lash zone needs to be controlled in order to reduce the lash zone oscillation and improve the torque response afterwards. Other methods to reduce lash may also be used including spark retardation within the engine, which may lead to reduced fuel efficiency and increased torque loading or oscillations on the engine. In a hybrid vehicle, controlling lash in the driveline becomes more complex as there may be more than one prime mover providing torque to the driveline.

SUMMARY

In an embodiment, a vehicle is provided with an engine, an electric machine connected to the engine by an upstream clutch, a transmission gearbox connected to the electric machine by a downstream clutch, and a controller. The controller is configured to: (i) control engagement of the downstream clutch, (ii) monitor a vehicle torque, and (iii) control the electric machine torque to a designated rate when the vehicle torque changes direction and the electric machine is operating.

In another embodiment, a method for controlling a hybrid vehicle having an engine and an electric machine is provided. A clutch downstream of the electric machine is engaged. A vehicle torque comprising a road load torque, an electric machine torque output, and an engine torque output is monitored. The electric machine torque output is controlled to a designated rate when the vehicle torque changes direction and the electric machine is operating.

In yet another embodiment, a hybrid vehicle system is provided with an electric machine and a controller. The controller is configured to (i) control a torque output of the electric machine to a designated rate within a time zone to reduce lash in a driveline when a downstream clutch is engaged, wherein the time zone is characterized by a vehicle torque being substantially zero and the vehicle is in one of an accelerating state and a decelerating state, and (ii) control at least one of the electric machine torque and an engine torque to meet driver demand outside of the zone.

Various embodiments according to the present disclosure have associated advantages. For example, embodiments according to the present disclosure provide for controlling the vehicle torque when the driveline is crossing a lash zone after a driver demand event. By controlling the vehicle torque, driveline lash may be reduced and clutches in the vehicle connected the powertrain components may remain engaged, thereby improving fuel efficiency of the vehicle. The electric motor may be used to control the vehicle torque as it has a faster response rate than the engine. Through a driveline lash zone, the torque output of the electric machine is controlled to a designated rate such that the vehicle torque stays substantially zero through the lash zone. The vehicle may be controlled in various ways to reduce lash after a driver demand event depending on the operating mode of the vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
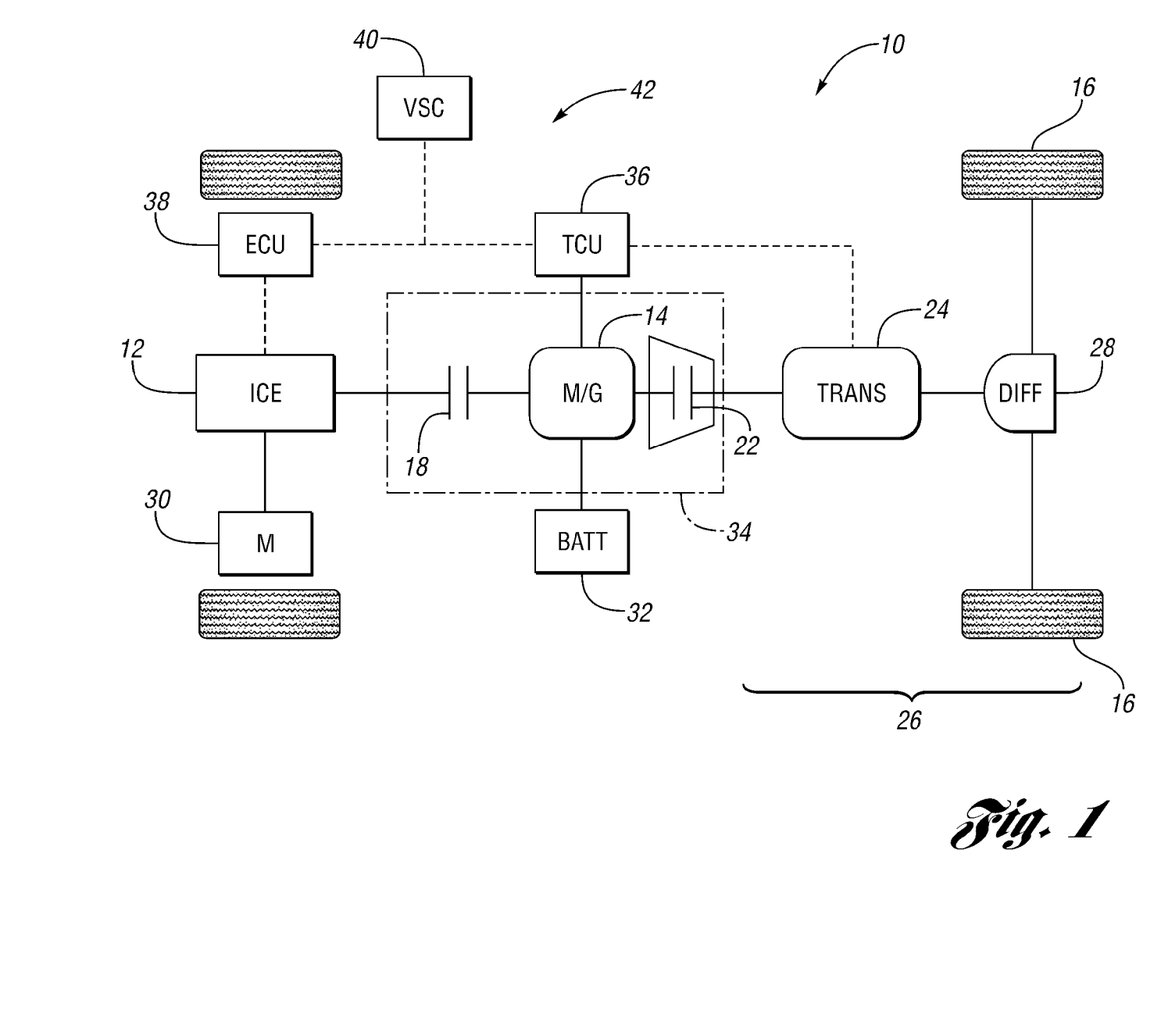
FIG. 1 is a schematic of a hybrid vehicle capable of implementing an embodiment.

FIG. 1 illustrates a schematic diagram of a hybrid vehicle 10 according to an embodiment. The vehicle 10 includes an engine 12, and an electric machine, which, in the embodiment shown in FIG. 1, is a motor generator (M/G) 14, and alternatively may be a traction motor. The M/G 14 is configured to transfer torque to the engine 12 or to the vehicle wheels 16.

The M/G 14 is connected to the engine 12 using a first clutch 18, also known as a disconnect clutch or the upstream clutch. The clutch 18 may also include a damper mechanism such as a series of plates and springs configured to help dampen changes in torque transferred between the engine 12 and the M/G 14 when the disconnect clutch 18 is being engaged. A second clutch 22, also known as a launch clutch or the downstream clutch, connects the M/G 14 to a transmission 24, and all of the input torque to the transmission 24 flows through the launch clutch 22. Although the clutches 18, 22 are described and illustrated as hydraulic clutches, other types of clutches, such as electromechanical clutches may also be used. Alternatively, the clutch 22 may be replaced with a torque converter having a bypass clutch, as described further below. In different embodiments, the downstream clutch 22 refers to various coupling devices for the vehicle 10 including a traditional clutch, and a torque converter having a bypass (lock-out) clutch.

The engine 12 output shaft is connected to the disconnect clutch 18, which in turn is connected to the input shaft for the M/G 14. The M/G 14 output shaft is connected to the launch clutch 22, which in turn is connected to the transmission 24. The various components of the vehicle 10 are positioned sequentially in series with one another. The launch clutch 22 connects the vehicle prime movers to the driveline 26, which includes the transmission 24, differential 28, and vehicle wheels 16, and their interconnecting components. In other embodiments, the method described herein may be applied to hybrid vehicle having other system architectures.

In another embodiment of the vehicle 10, the downstream clutch 22 is a bypass clutch with a torque converter. The input from the M/G 14 is the impeller side of the torque converter, and the output from the torque converter to the transmission 24 is the turbine side. The torque converter 22 transfers torque using its fluid coupling, and torque multiplication may occur depending on the amount of slip between the impeller and turbine sides. The bypass or lock-up clutch for the torque converter may be selectively engaged to create a mechanical connection between the impeller side and the turbine side for direct torque transfer. The bypass clutch may be slipped and/or opened to control the amount of torque transferred through the torque converter. The torque converter may also include a lockup clutch.

In the vehicle 10, the launch clutch 22 or bypass clutch for the torque converter may be locked to increase fuel efficiency, and may be locked when crossing a lash zone during a tip in or tip out event. The driveability and control of lash within the driveline depends on the control of the powertrain torque from the engine 12 and/or the electric machine 14. M/G 14 torque may be controlled to a greater accuracy and with a faster response time than engine 12 torque. During an electric-only mode of operation for the vehicle 10, the M/G 14 torque may be controlled when crossing a lash zone. During a hybrid mode of operation of the vehicle with both the engine 12 and M/G 14 operating, the M/G 14 torque and engine 12 torque may be controlled together in order to improve driveability of the vehicle 10 and reduce lash in the driveline.

The engine 12 is a direct injection engine. Alternatively, the engine 12 may be a another type of engine or prime mover, such as a port injection engine or fuel cell, or use various fuel sources, such as diesel, biofuel, natural gas, hydrogen, or the like. In some embodiments, the vehicle 10 also includes a starter motor 30 operatively connected to the engine 12, for example, through a belt or gear drive. The starter motor 30 may be used to provide torque to start the engine 12 without the addition of torque from the M/G 14, such as for a cold start or some high speed starting events.

The M/G 14 is in communication with a battery 32. The battery 32 may be a high voltage battery. The M/G 14 may be configured to charge the battery 32 in a regeneration mode, for example when vehicle power output exceeds driver demand, through regenerative braking, or the like. The M/G 14 may also be placed in a generator configuration to moderate the amount of engine 12 torque provided to the driveline 26. In one example the battery 32 is configured to connect to an external electric grid, such as for a plug-in electric hybrid vehicle (PHEV) with the capability to recharge the battery from an electric power grid, which supplies energy to an electrical outlet at a charging station. A low voltage battery may also be present to provide power to the starter motor or other vehicle components, or low voltage power may be provided through a DC to DC converter.

In some embodiments, the transmission 24 is an automatic transmission and connected to the drive wheels 16 in a conventional manner, and may include a differential 28. The vehicle 10 is also provided with a pair of non-driven wheels, however, in alternative embodiments, a transfer case and a second differential can be utilized in order to positively drive all of the vehicle wheels.

The M/G 14 and the clutches 18, 22 may be located within a motor generator case 34, which may be incorporated into the transmission 24 case, or alternatively, is a separate case within the vehicle 10. The transmission 24 has a gear box to provide various gearing ratios for the vehicle 10. The transmission 24 gearbox may include clutches and planetary gearsets, or other arrangements of clutches and gear trains as are known in the art. The transmission 24 may be an automatic six speed transmission, other speed automatic transmission, or other gearbox as is known in the art.

The transmission 24 is controlled using a transmission control unit (TCU) 36 or the like to operate on a shift schedule, such as a production shift schedule, that connects and disconnects elements within the gear box to control the ratio between the transmission output and transmission input. The TCU 36 also acts to control the M/G 14, the clutches 18, 22, and any other components within the motor generator case 34.

An engine control unit (ECU) 38 is configured to control the operation of the engine 12. A vehicle system controller (VSC) 40 transfers data between the TCU 36 and ECU 38 and is also in communication with various vehicle sensors. The control system 42 for the vehicle 10 may include any number of controllers, and may be integrated into a single controller, or have various modules. Some or all of the controllers may be connected by a controller area network (CAN) or other system. The control system 42 may be configured to control operation of the various components of the transmission 24, the motor generator assembly 34, the starter motor 30 and the engine 12 under any of a number of different conditions, including in a way that minimizes or reduces lash in the driveline 26 and impact on the driver during tip in or tip out events.

Under normal powertrain conditions (no subsystems/components faulted), the VSC 40 interprets the driver's demands (e.g. PRND and acceleration or deceleration demand), and then determines the wheel torque command based on the driver demand and powertrain limits. In addition, the VSC 40 determines when and how much torque each power source needs to provide in order to meet the driver's torque demand and to achieve the operating points (torque and speed) of the engine 12 and M/G 14. The VSC 40 may interpret a total vehicle torque which includes any positive or negative engine 12 or M/G 14 torque as well as the road load torque.

Although the operation of the clutches 18, 22 described uses the term "pressure", thereby implying a hydraulic clutch, other types of devices, such as electromechanical clutches or torque converters may also be used. In the case of hydraulic clutches, the pressure on the clutch plates is related to torque capacity. In the same way, the forces acting on the plates in a non-hydraulic clutch are also related to torque capacity. Therefore, for consistency in nomenclature, unless otherwise specifically defined, the operation of the clutches 18, 22 described herein are in terms of "pressure", though it is understood that it also includes situations where a non-hydraulic force is applied to the clutch plates in a non-hydraulic clutch.

When one of the clutches 18, 22 is locked or engaged, the rotational speeds of the driveline components on either side of the clutch are equal. Slip is the speed difference from one side of a clutch to the other, such that when one of the clutches is slipping, one side has a different speed than the other side. For example, if the M/G 14 output rotational speed is at 1500 rpm and the launch clutch 22 is slipping 100 rpm, the transmission 24 side of the launch clutch 22 is at 1600 rpm. When the downstream clutch 22 is a bypass clutch for a torque converter, it may be also be considered to be slipping when it is fully open since there is a speed differential across the clutch, even when no torque is being transferred through the bypass clutch.

As the pressure in one of the clutches 18, 22 is increased, more torque can be transmitted through the clutch 18, 22. If the pressure is constant, one can increase the torque at one side of the clutch up to a point where the two sides start to slip. At a given pressure for one of the clutches 18, 22, the maximum amount of torque that can be transmitted through the clutch before it begins to slip is the torque capacity or static capacity of the clutch. After the clutch starts slipping at that pressure, the torque capacity remains constant. At a given torque capacity, if the torque is raised on the input side of the clutch, the speed will be raised on that side of the clutch (i.e. the slip will increase) and the torque transmitted through the clutch will remain the same because the clutch is at capacity. Alternatively, if the clutch is slipping and at a constant pressure, lowering the torque on the input side of the clutch (thus slowing the rotational speed on that side) will slow or stop the slip. At a given torque through the clutch, the clutch will begin to slip or increase slip if you lower the pressure to the clutch. When a clutch is locked at full pressure it is typically designed such that it does not slip with an increase in torque.

In other words, the speed (and torque of torque producers) on one side of the clutch may vary and be disturbed, and when the clutch is slipping, the other side of the clutch is isolated and receives the torque based on the torque capacity of the clutch.

In an alternative embodiments, the clutch 22 may be replaced with a torque converter unit including a torque converter and a lockup clutch or bypass clutch. The torque converter has torque multiplication effects when certain rotational speed differentials exist across the torque converter. During torque multiplication, the output torque of the torque converter is larger than that of the input torque due to torque multiplication across the torque converter. Torque multiplication exists for example, when the vehicle 10 is started from rest and the input shaft to the torque converter begins to rotate, and the output shaft from the torque converter is still at rest or has just begun to rotate.

The lockup clutch or bypass clutch is used to lock out the torque converter such that the input and output torques for the downstream torque transfer device 22 are equal to one another, and the input and output rotational speeds for the device 22 are equal to one another. A locked clutch eliminates slipping and driveline inefficiency across the torque converter, for example, when the rotational speed ratio across the torque converter is greater than approximately 0.8, and may increase fuel efficiency for the vehicle 10.

Figure 2:
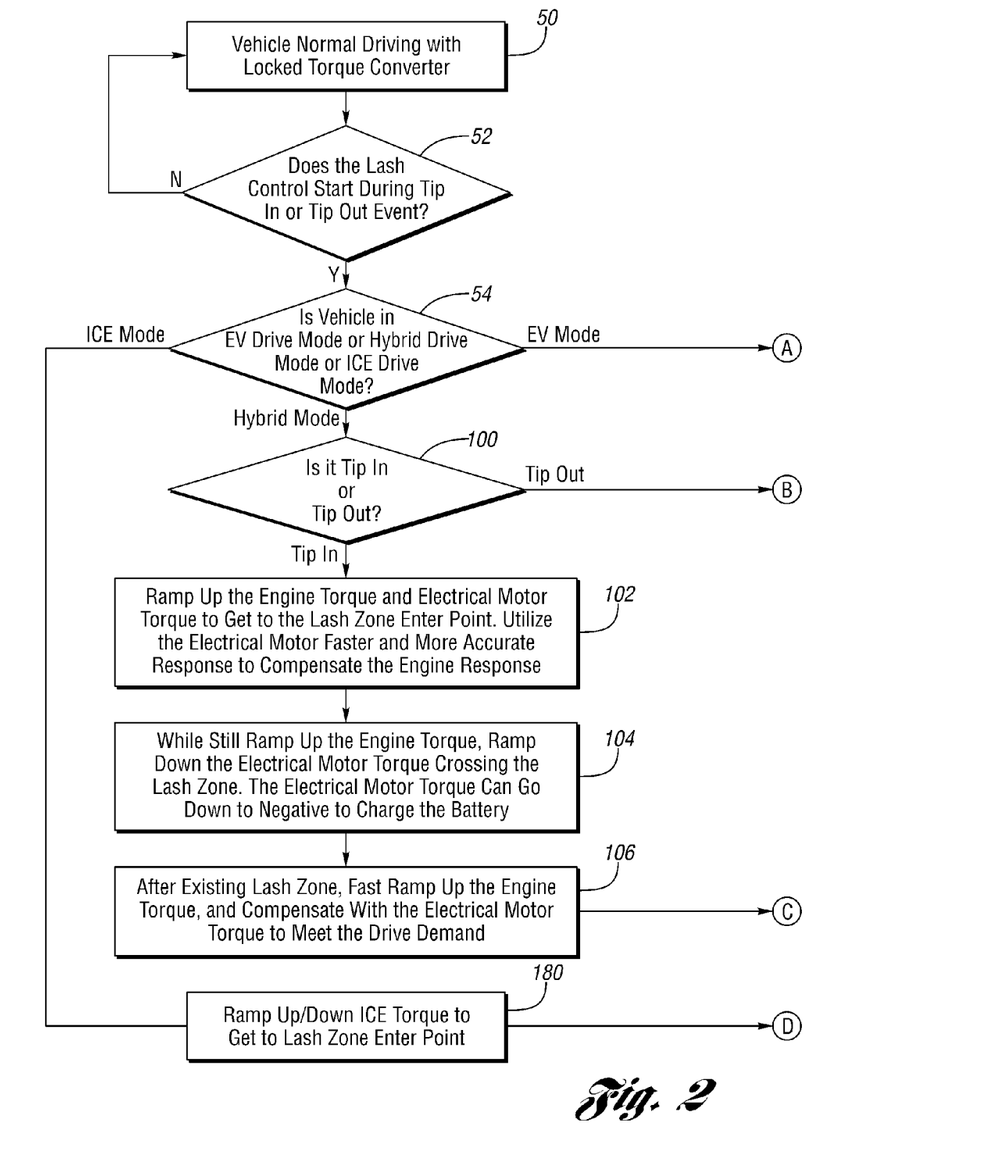
FIG. 2 is a flow chart illustrating a method of controlling a hybrid vehicle according to an embodiment.

FIG. 2 illustrates a flow chart for controlling the powertrain of the vehicle 10 to reduce driveline 26 lash. Lash may be an oscillation in the driveline 26 that occurs when there is a change in the torque amount and/or direction. A typical lash condition is when the torque in the driveline 26, or the total vehicle torque, is changing from a positive torque through the driveline to a negative torque through the driveline 26, or vice versa. The total vehicle torque at within a time zone where lash occurs may be at or near zero, or substantially zero. The vehicle torque is the road load torque added to the positive, or negative, torque provided by the engine 12 and/or the M/G 14. Road load torque is typically a negative value. The lash condition for changing vehicle torque may occur for example during a vehicle acceleration event, or a vehicle deceleration event, such as tip in or tip out, that causes the overall vehicle torque to go from negative to positive, or vice versa.

The controller 42 begins at 50 where it determines if the vehicle 10 is operating under normal driving conditions with a locked or engaged launch clutch 22, or locked or engaged bypass clutch for a torque converter system 22. At 52, the controller 42 determines if a lash control event due to a driver demand event may occur, for example by monitoring for a tip or tip out command received by an accelerator pedal or other input.

If a lash event may be occurring due to a driver demand event, the controller 42 proceeds to 54 to determine the mode of operation for the present state of the vehicle 10. In an electric-only mode of operation only the M/G 14 operating. In a hybrid mode of operation, the engine 12 and the M/G 14 are operating. In the electric-only mode or the hybrid mode, the M/G 14 may be acting as either a motor to provide torque output, or as a generator to receive a torque input and charge the battery 32. In an engine-only mode of operation, only the engine 12 is operating. In the engine-only mode, the charge status of the battery 32 may not permit M/G 14 operation, for example when the battery is above it maximum charge capacity and the M/G would otherwise be generating based on vehicle operation, or in a service mode when the M/G 14 is not operational.

If the vehicle is operating in electric-only mode, the controller 42 proceeds to 56. The torque of the M/G 14 is quickly ramped up for tip in, or ramped down for tip out to meet driver demand until the vehicle torque approaches the lash zone entry point. Through the lash zone, where the total vehicle torque is crossing over from a positive to negative value, or vice versa, and is near zero, the torque of the M/G 14 is controlled to a designated rate at 58, thereby reducing lash and driveline 26 oscillations. Once exiting the lash zone at 60, the M/G 14 torque may be quickly ramped up for tip in conditions, or ramped down for tip out conditions, to meet the driver demand. The lash control algorithm ends at 62.

Figure 3:
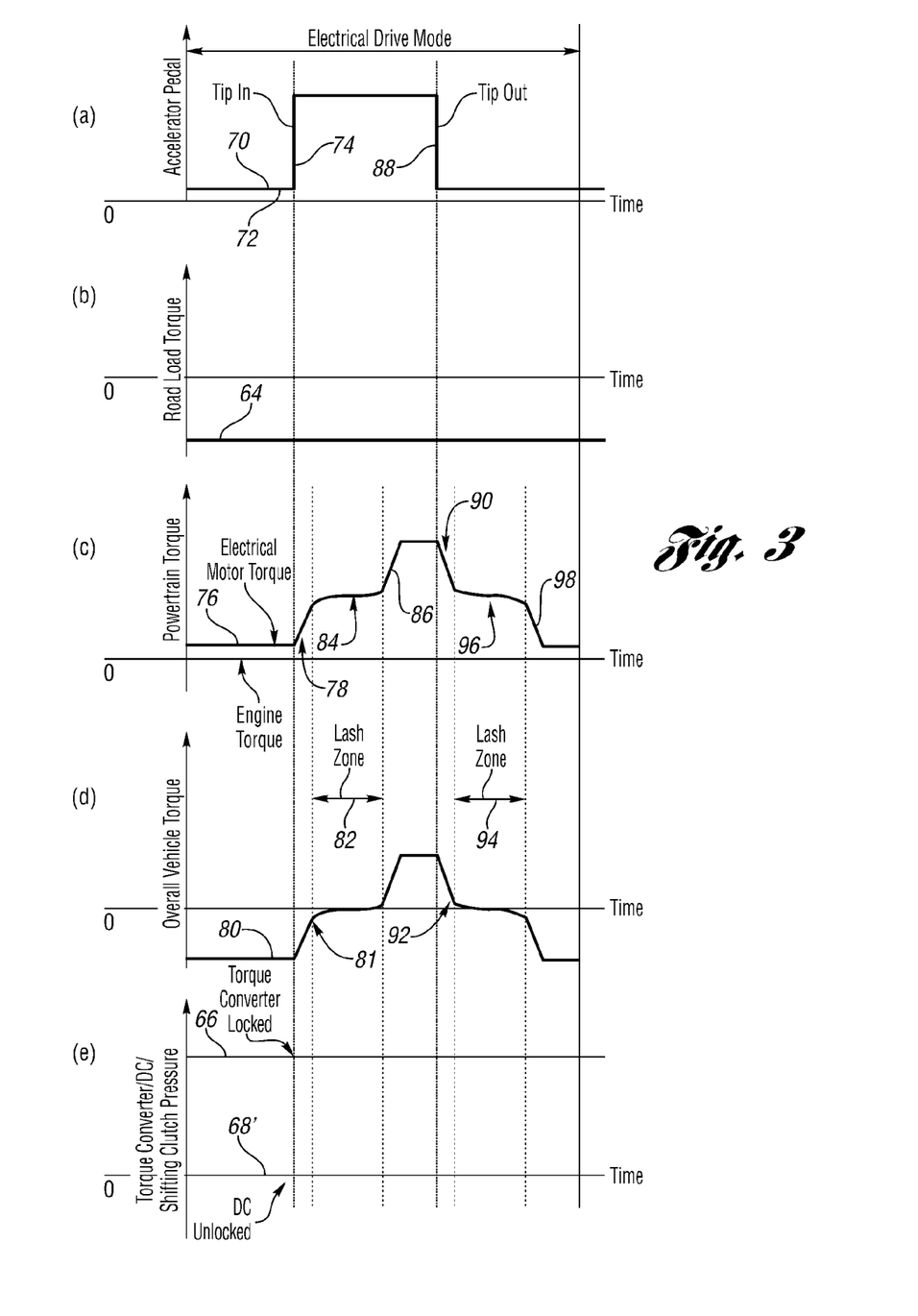
FIG. 3 is a timing chart for the hybrid vehicle in an electric only mode of operation according to an embodiment.

FIG. 3 illustrates a chart of an example of lash control during an electric-only mode of operation. FIG. 3b illustrates a constant road load torque 64. In other examples, the road load torque may vary. FIG. 3e illustrates a locked launch clutch 22, or bypass for a torque converter, at 66 and an unlocked or opened disconnect clutch 18 at 68, where the clutch 22 is at its locked pressures. The disconnect clutch 18 is open because the vehicle 10 is in electric only mode and the engine 12 is not operating and is likely disengaged from the M/G 14. FIG. 3a illustrates an accelerator pedal input for tip in and tip out at 70. Initially, the accelerator pedal may be at a low demand position, such as during steady cruise at 72. A tip in event occurs at 74. Referring now to FIG. 3c, the M/G 14 torque output 76 is increased in order to meet the additional demand due to tip in at region 78, which relates to step 56. Note that the overall vehicle torque 80 shown in FIG. 3d increases along with the increased M/G torque output 76, as the vehicle torque 80 is the road load torque 64 and M/G torque 76 combined. At 81, the vehicle torque is approaching zero, and is approaching a crossover from negative to positive, indicating an approaching lash zone 82. Within the lash zone 82, the M/G 14 torque 76 is controlled to a designated rate at 84, and at step 58 in FIG. 2. The designated rate is such that the overall vehicle torque 80 has a zero or low rate of change through the lash zone 82, thereby reducing lash in the driveline through an abrupt or fast torque change. At the end of the lash zone 82, the M/G torque 76 may be ramped up or increased, as shown at 86 to meet driver demand as input using the tip in command 70, and described at step 60 in FIG. 2.

A tip out command while in electric-only mode occurs at 88. The M/G torque 76 is ramped down or decreased at 90, which relates to step 56. Note that the overall vehicle torque 80 shown in FIG. 3*d* decreases along with the decreased M/G torque output 76. At 92, the vehicle torque 80 is approaching zero, and is approaching a crossover from positive to negative torque, indicating an approaching lash zone 94. Within the lash zone 94, the M/G torque 76 is controlled to a designated rate at 96, which relates to step 58 in FIG. 2. At the end of the lash zone 94, the M/G torque 76 may be ramped down further or decreased, as shown at 98 to meet driver demand as input using the tip out command 70, and described at step 60 in FIG. 2. Note that during both the tip in and tip out commands, a vehicle acceleration or deceleration respectively is occurring, which also signifies a potential lash event.

Referring back to FIG. 2, if the vehicle is operating in hybrid mode, the controller 42 proceeds to 100, where it determines if a tip in event or tip out event is occurring. For a tip in event, the controller 42 proceeds to ramp up the engine 12 torque and the M/G 14 torque until the vehicle torque approaches the lash zone entry point at 102. At 104, through the lash zone, where the total vehicle torque is crossing over from a negative to a positive value, the torque of engine 12 continues to be ramped up in a controlled gradual manner to increase engine 12 torque output, while the M/G 14 torque is reduced. The M.G 14 torque is controlled to a designated rate such that it will offset the increasing engine 12 torque through the lash zone to maintain a substantially zero overall vehicle torque through the lash zone, thereby reducing lash and driveline 26 oscillations. The M/G 14 torque may even go negative such that the M/G 14 is generating and charging the battery to offset the engine 12 torque. The M/G torque is controlled for the timing due to its higher accuracy and faster response than engine 12 torque control. The engine torque can therefore be controlled to a more accurate torque value. Once exiting the lash zone at 106, the engine 12 torque may be further increased, and the M/G 14 torque may be controlled such that driver demand is met. The controller 42 then may optimize the powertrain operation at 108 between engine 12 and M/G 14 operation and contributions based on vehicle 10 state and vehicle operations. The lash control algorithm ends at 62.

For a tip out event, the controller 42 proceeds from 100 to 110, where it ramps down the engine 12 torque and the M/G 14 torque until the vehicle torque falls and approaches the lash zone entry point. The faster response of the M/G 14 compared to the engine 12 may allow for the lash zone entry point to be reached quickly. At 112, through the lash zone, where the total vehicle torque is crossing over from a positive to a negative value, the torque of engine 12 continues to be ramped down in a torque controlled gradual manner to decrease engine 12 torque output, while the M/G 14 torque is ramped up. The M.G 14 torque is controlled to a designated rate such that it will offset the continually decreasing engine 12 torque through the lash zone to maintain a substantially zero overall vehicle torque through the lash zone, thereby reducing lash and driveline 26 oscillations. The M/G 14 torque may even go positive such that the M/G 14 is acting as a motor to offset the reduced engine 12 torque. The M/G 14 torque is controlled for timing due to its faster response and higher precision of control compared to engine torque. Once exiting the lash zone at 114, the engine 12 torque may be further decreased, and the M/G 14 torque may be controlled such that driver demand is met. The controller 42 then may optimize the powertrain operation at 108 between engine 12 and M/G 14 operation and contributions based on vehicle 10 state and vehicle operations. The lash control algorithm ends at 62.

Figure 4:
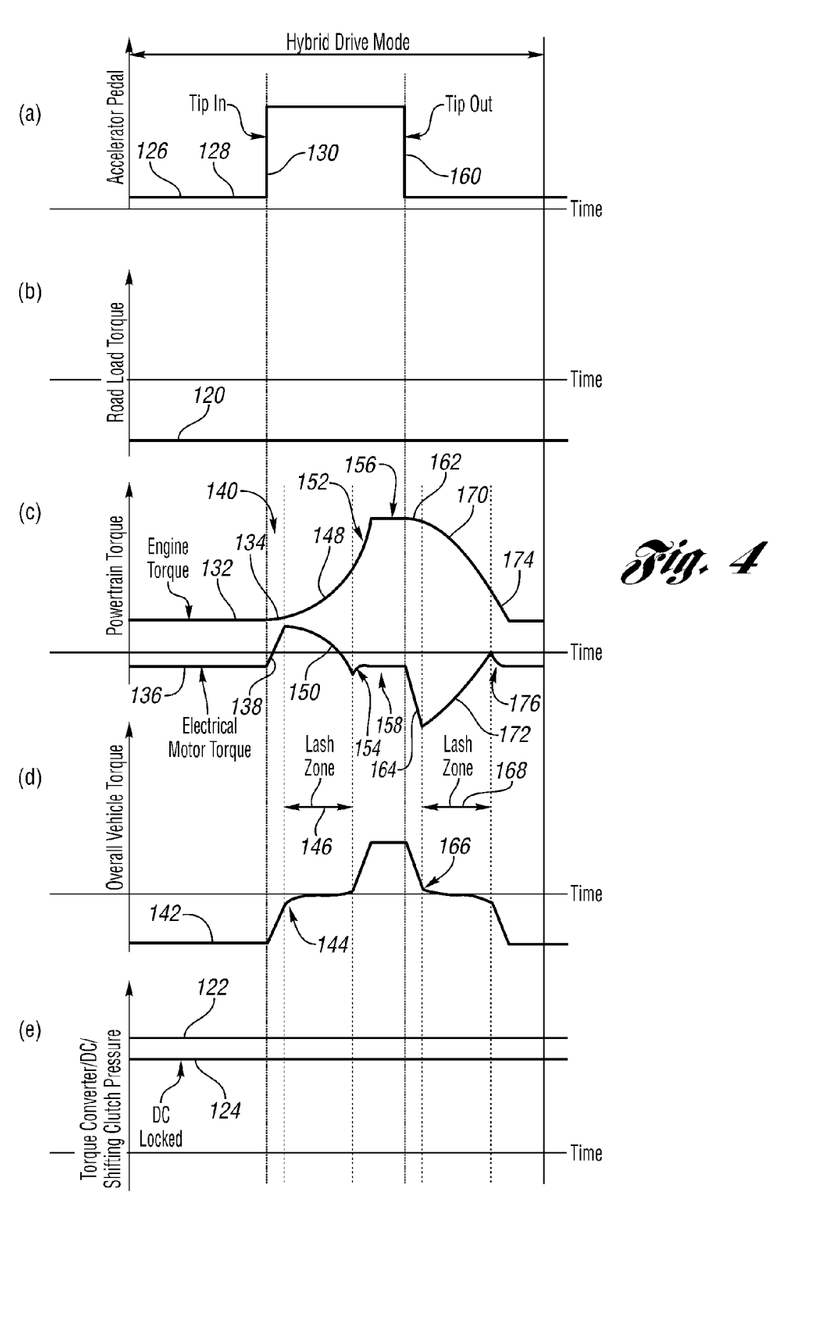
FIG. 4 is a timing chart for the hybrid vehicle in a hybrid mode of operation according to an embodiment.

FIG. 4 illustrates a chart of an example of lash control during a hybrid mode of operation. FIG. 4*b* illustrates a constant road load torque 120. In other examples, the road load torque may vary. FIG. 4*e* illustrates a locked launch clutch 22, or bypass for a torque converter, at 122 and a locked disconnect clutch 18 at 124, where the clutches 18, 22 are at their respective locked pressures. FIG. 4*a* illustrates an accelerator pedal input for tip in and tip outs at 126. Initially, the accelerator pedal may be at a low demand position, such as during steady cruise at 128.

A tip in event occurs at 130. Referring now to FIG. 4*c*, the engine torque 132 begins to be ramped up at 134 after tip in, and the M/G torque output 136 is also increased at 138 in order to meet the additional demand due to tip in at region 140, which relates to step 102. In this example, the M/G 14 was in a regeneration mode prior to the tip in event. Note that the M/G torque 138 may be increased at a much faster rate than the engine torque 134 due to the faster response time of the M/G 14. Note also that the overall vehicle torque 142 shown in FIG. 4*d* increases along with the increased engine torque output 134 and M/G torque output 138, as the vehicle torque 142 is the road load torque 120, engine torque 132, and M/G torque 136 combined.

At 144, the vehicle torque 142 is approaching zero, and is approaching a crossover from negative to positive, indicating an approaching lash zone 146. Within the lash zone 146, the engine torque continues to increase as shown at 148, and the M/G 14 torque at 152 is controlled to a designated rate, relating to step 104 in FIG. 2. The designated rate for the M.G torque 150 is such that the overall vehicle torque 142 has a zero or low rate of change through the lash zone 146, thereby reducing lash in the driveline through an abrupt or fast torque change from the negative to the positive side. At the end of the lash zone 146, the engine 12 torque may be further increased at 152, and the M/G 14 torque may be controlled such that driver demand is met at 154, relating to step 106. The torque outputs of the engine at 156 and M/G at 158 may be then controlled based on vehicle operation relating to step 108.

A tip out event occurs at 160. Referring to FIG. 4*c*, the engine torque 132 begins to be ramped down at 162 after tip out, and the M/G torque output 136 is also decreased at 164 in order to meet the reduced demand due to tip out, which relates to step 110. Note that the M/G torque 164 may be decreased at a much faster rate than the engine torque 162 due to the faster response time of the M/G 14. Note also that the overall vehicle torque 142 shown in FIG. 4*d* decreases along with the decreased engine torque output 162 and M/G torque output 164, as the vehicle torque 142 is the road load torque 120, engine torque 132, and M/G torque 136 combined.

At 166, the vehicle torque 142 is approaching zero, and is approaching a crossover from positive to negative, indicating an approaching lash zone 168. Within the lash zone 168, the engine torque continues to decrease as shown at 170, and the M/G 14 torque at 172 is controlled to a designated rate, relating to step 112 in FIG. 2. The designated rate for the M/G torque 172 is such that the overall vehicle torque 142 has a zero or low rate of change through the lash zone 168, thereby reducing lash in the driveline through an abrupt or fast torque change. At the end of the lash zone 168, the engine 12 torque may be further decreased at 174, and the M/G 14 torque may be controlled such that driver demand is met at 176, relating to step 114. The torque outputs of the engine 132 and M/G 136 may be then controlled based on vehicle operation relating to step 108.

Referring back to FIG. 2, if the vehicle is operating in engine-only mode, the controller 42 proceeds to 180. The torque of the engine 12 is ramped up due to tip in, or ramped down due to tip out until the vehicle torque approaches the lash zone entry point. Through the lash zone at 182, where the total vehicle torque is crossing over from a positive to negative value, or vice versa, the engine 12 torque continues to increase or decrease based on the respective tip in or tip out command. In 182, a clutch downstream of the engine 12 is operated at a reduced torque capacity, thereby limiting the engine 12 torque that is transmitted through to the driveline 26, and reducing lash and driveline 26 oscillations. The torque capacity of the clutch is controlled such that the engine torque transmitted through the clutch generally offsets the road load torque, causing the total vehicle torque to remain substantially zero through the lash zone. Various configurations may be used to control the clutch torque capacity. In one example, the launch clutch 22 or bypass clutch for a torque converter remains locked, while the torque capacity of the disconnect clutch 18 or a shifting clutch within the transmission is operated with a reduced controlled capacity. In another example, with a vehicle having only a launch clutch 22 and no torque converter, the launch clutch 22 torque capacity may be reduced and controlled. In yet another example, the bypass clutch for a torque converter device 22 may be controlled to a reduced capacity; however, in this case, torque will pass through the torque converter to the driveline 26 and torque multiplication effects, the torque ratio of the torque converter, and the like, may need to be considered in the overall control strategy. Once exiting the lash zone at 184, the clutch with the reduced capacity may be engaged or locked, and the engine 12 torque may be ramped up for tip in conditions, or ramped down for tip out conditions, to meet the driver demand. The lash control algorithm ends at 62.

Figure 5:
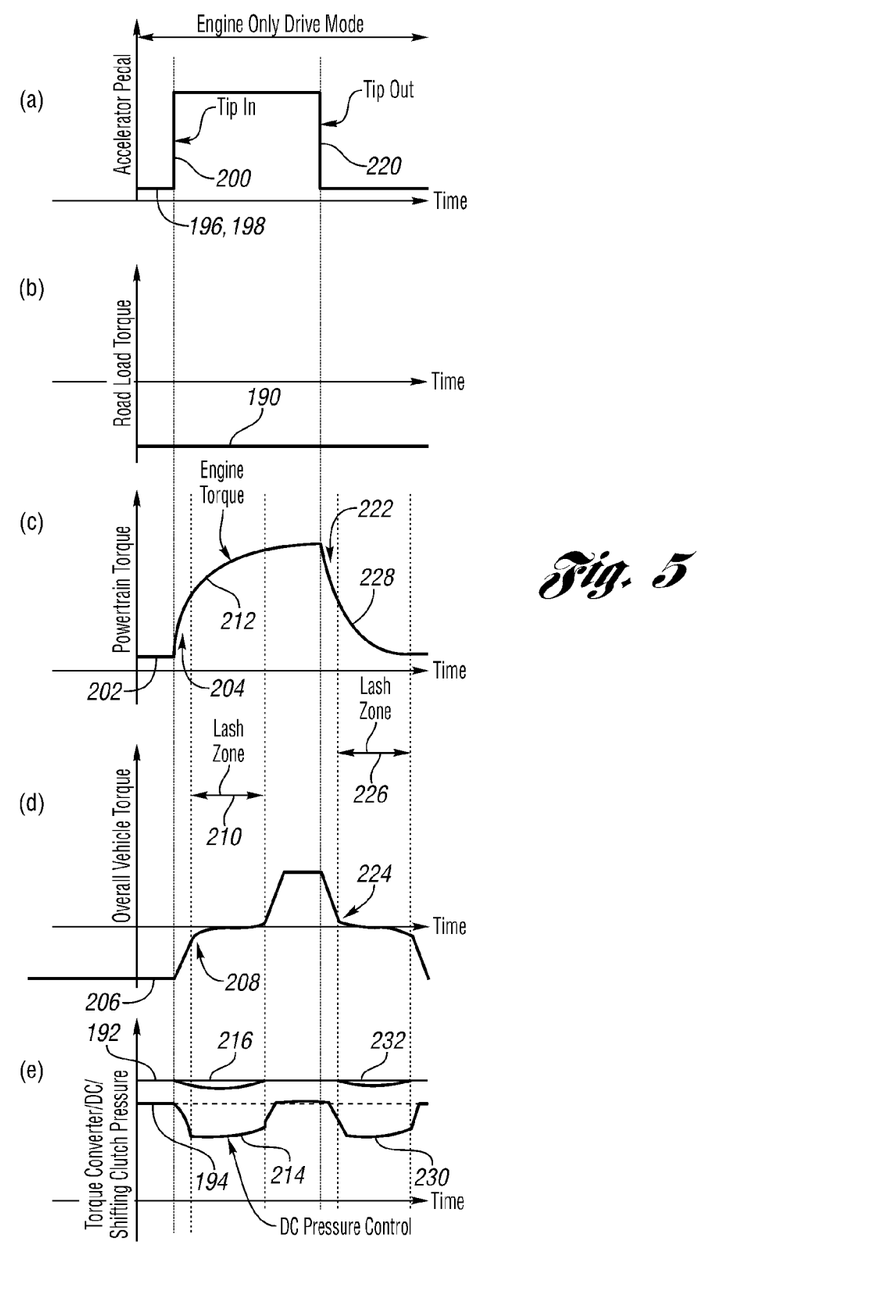
FIG. 5 is a timing chart for the hybrid vehicle in an engine-only mode of operation according to an embodiment.

FIG. 5 illustrates a chart of an example of lash control during an engine-only mode of operation. FIG. 5*b* illustrates a constant road load torque 190. In other examples, the road load torque may vary. FIG. 5*e* illustrates a locked launch clutch 22, or bypass for a torque converter, at 192 and a locked disconnect clutch 18 at 194, where the clutches 18, 22 are at their respective locked pressures. FIG. 5*a* illustrates an accelerator pedal input for tip in and tip outs at 196. Initially, the accelerator pedal may be at a low demand position, such as during steady cruise at 198.

A tip in event occurs at 200. Referring now to FIG. 5*c*, the engine 12 torque output 202 is increased in order to meet the additional demand due to tip in at region 204, which relates to step 180 in FIG. 2. Note that the overall vehicle torque 206 shown in FIG. 5*d* increases along with the increased engine torque output, as the vehicle torque 206 is the road load torque 190 and engine torque 202 combined. At 208, the vehicle torque is approaching zero, and is approaching a crossover from negative to positive, indicating an approaching lash zone 210. Within the lash zone 210, the engine torque 212 continues to increase in order to meet overall driver demand. The torque capacity of a clutch downstream of the engine 12 is reduced such that the torque transmitted from the engine 12, through the clutch, and to the driveline 26 is controlled. Either the torque capacity of the disconnect clutch (or a transmission shifting clutch) is reduced as shown by 214, or alternatively, the torque capacity of the bypass clutch for the torque converter or the launch clutch 22 is reduced at 216. Although both are shown for illustrative purposes, in some embodiments, only one of the capacities is reduced, while the other clutch remains locked. The designated torque capacity is selected such that the overall vehicle torque 206 has a zero or low rate of change through the lash zone 210, thereby reducing lash in the driveline through an abrupt or fast torque change. At the end of the lash zone 210, the clutch is locked, and the engine 12 torque is controlled to meet driver demand, and described at step 184 in FIG. 2.

A tip out event occurs at 220. Referring to FIG. 5*c*, the engine 12 torque output 202 is decreased or ramped down in order to meet the reduced demand due to tip in at region 222, which relates to step 180 in FIG. 2. Note that the overall vehicle torque 206 shown in FIG. 5*d* decreases along with the decreased engine torque output, as the vehicle torque 206 is the road load torque 190 and engine torque 202 combined. The engine torque is rapidly decreased at 222 to quickly approach the lash zone. At 224, the vehicle torque 206 is approaching zero, and is approaching a crossover from positive to negative, indicating the approaching lash zone 226. Within the lash zone 226, the engine torque 228 continues to decrease in order to be able to meet overall driver demand for the tip out event. The torque capacity of a clutch downstream of the engine 12 is reduced such that the torque transmitted from the engine 12, through the clutch, and to the driveline 26 is controlled. Either the torque capacity of the disconnect clutch (or a transmission shifting clutch) is reduced as shown by 230, or alternatively, the torque capacity of the bypass clutch for the torque converter or the launch clutch 22 is reduced at 232. Although both are shown for illustrative purposes, in some embodiments, only one of the capacities would be reduced, similar to the tip in case discussed previously. The designated reduced torque capacity of the clutch is selected such that the overall vehicle torque 206 has a zero or low rate of change through the lash zone 226. For example the torque capacity may be selected to offset the road load at that time. At the end of the lash zone 226, the clutch is locked, and the engine 12 torque is controlled to meet driver demand, and described at step 184 in FIG. 2.

For example, various embodiments according to the present disclosure provide for controlling the vehicle torque when the driveline is crossing a lash zone after a driver demand event. By controlling the vehicle torque, driveline lash may be reduced and clutches in the vehicle connected the powertrain components may remain engaged, thereby improving fuel efficiency of the vehicle. The electric motor may be used to control the vehicle torque as it has a faster response rate than the engine. Through a driveline lash zone, the torque output of the electric machine is controlled to a designated rate such that the vehicle torque stays substantially zero through the lash zone. The vehicle may be controlled in various ways to reduce lash after a driver demand event depending on the operating mode of the vehicle.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    an electric machine connected to an engine by an upstream clutch and connected to a transmission gearbox by a torque converter and a bypass, downstream clutch; and
    a controller configured to reduce lash in a driveline by controlling a torque of the electric machine to a designated rate of change within a time zone characterized by a vehicle torque changing direction and being substantially zero, and the electric machine is operating.

2. The vehicle of claim 1 wherein the downstream clutch, the electric machine, the upstream clutch, and the engine are positioned in series with one another.

3. The vehicle of claim 1 wherein the vehicle torque changes direction during a driver demand event.

4. The vehicle of claim 1 wherein the vehicle torque changes direction during one of a vehicle acceleration event and a vehicle deceleration event.

5. The vehicle of claim 1 further comprising a pair of wheels connected to the gearbox, the wheels and the gearbox providing the driveline.

6. The vehicle of claim 5 wherein a road load torque is provided through the wheels of the driveline, and
wherein the vehicle torque is a sum of road load torque, engine torque, and the torque of the electric machine.

7. The vehicle of claim 5 wherein the controller is configured to control the torque of the electric machine to the designated rate of change when the engine is disengaged from the electric machine.

8. The vehicle of claim 7 wherein the time zone occurs after a driver demand event; and
wherein the controller is configured to control the torque of the electric machine to meet driver demand before and after the time zone.

9. The vehicle of claim 5 wherein the controller is configured to control the torque of the electric machine to the designated rate of change when the engine is engaged to the electric machine.

10. The vehicle of claim 9 wherein the time zone occurs after a driver demand event; and
wherein the controller is configured to control the torque of the electric machine and the engine torque to meet driver demand before and after the time zone.

11. The vehicle of claim 5 wherein the controller is configured to control an engagement mechanism downstream of the engine to a designated capacity when the engine is engaged to the electric machine, the torque of the electric machine is substantially zero, and the vehicle torque changes direction, thereby reducing lash in the driveline.

12. The vehicle of claim 11 wherein the time zone occurs after a driver demand event; and
wherein the controller is configured to control the engine torque to meet driver demand before and after the time zone.

13. The vehicle of claim 11 wherein the engagement mechanism is one of the upstream clutch, the downstream clutch, and a shifting clutch in the gearbox.

14. A method for controlling a hybrid vehicle having an engine and an electric machine, the method comprising:
engaging a clutch downstream of the electric machine;
controlling an electric machine torque output to a designated rate of change when a vehicle torque changes direction and the electric machine is operating, wherein the vehicle torque comprises a road load torque, the electric machine torque output, and an engine torque output; and
controlling the electric machine torque output and the engine torque output to meet driver demand before and after a time zone when the vehicle is operating in a hybrid mode;
wherein the electric machine torque output is controlled to the designated rate of change when the vehicle is operating in the hybrid mode and the vehicle torque changes direction, thereby reducing lash in a driveline, wherein the vehicle torque changing direction occurs within the time zone when the vehicle torque is substantially zero, the time zone occurring after a driver demand event.

15. The method of claim 14 wherein the electric machine torque is controlled to the designated rate of change when the vehicle is operating in an electric-only mode, thereby reducing lash in the driveline
the method further comprising controlling the electric machine torque to meet driver demand before and after the time zone when the vehicle is operating in the electric-only mode.

16. The method of claim 14 further comprising controlling a clutch downstream of the engine to a designated capacity when the vehicle is operating in an engine-only mode and the vehicle torque changes direction, thereby reducing lash in the driveline, and
controlling the engine torque to meet driver demand before and after the time zone when the vehicle is operating in the engine-only mode.

17. A hybrid vehicle system comprising:
an electric machine;
a torque converter having a bypass clutch, the bypass clutch being a downstream clutch; and
a controller configured to (i) control a torque output of the electric machine to a designated rate of change within a time zone to reduce lash in a driveline when the downstream clutch is engaged, wherein the time zone is characterized by a vehicle torque being substantially zero and the vehicle is in one of an accelerating state and a decelerating state, and (ii) control at least one of the torque output of the electric machine and an engine torque output to meet driver demand outside of the zone.

* * * * *